US012795314B2

(12) United States Patent
Nawfal et al.

(10) Patent No.: US 12,795,314 B2
(45) Date of Patent: Nov. 10, 2026

(54) SPATIAL AUDIO UPSCALING USING MACHINE LEARNING

(71) Applicant: Apple Inc., Cupertino, CA (US)

(72) Inventors: Ismael H. Nawfal, Redondo Beach, CA (US); Symeon Delikaris Manias, Los Angeles, CA (US); Mehrez Souden, Los Angeles, CA (US); Joshua D. Atkins, Lexington, MA (US)

(73) Assignee: Apple Inc., Cupertino, CA (US)

( * ) Notice: Subject to any disclaimer, the term of this patent is extended or adjusted under 35 U.S.C. 154(b) by 175 days.

(21) Appl. No.: 18/605,688

(22) Filed: Mar. 14, 2024

(65) Prior Publication Data

US 2024/0312468 A1 Sep. 19, 2024

Related U.S. Application Data

(60) Provisional application No. 63/490,579, filed on Mar. 16, 2023.

(51) Int. Cl.
*G10L 19/008* (2013.01)
*H04S 1/00* (2006.01)
*H04S 7/00* (2006.01)

(52) U.S. Cl.
CPC .............. *H04S 7/30* (2013.01); *G10L 19/008* (2013.01); *H04S 1/007* (2013.01); *H04S 2420/11* (2013.01)

(58) Field of Classification Search
CPC ...... G10L 19/008; H04S 7/30; H04S 2420/11; H04S 2400/05; H04S 7/302
USPC .......................................... 381/17–19, 22–23
See application file for complete search history.

(56) References Cited

U.S. PATENT DOCUMENTS 9,093,063 B2 7/2015 Vilkamo et al.
9,928,842 B1 3/2018 Merimaa et al.
11,076,257 B1 * 7/2021 Sunder .................... H04S 7/304
2009/0092258 A1 4/2009 Merimaa et al.
2018/0270600 A1 9/2018 Boehm et al.
2019/0019520 A1 1/2019 Berthet
2019/0306451 A1 * 10/2019 Wang ................ H04N 21/8106
(Continued)

FOREIGN PATENT DOCUMENTS

EP 2210427 B1 7/2010
WO 2014171791 A1 10/2014
WO WO-2016033358 A1 * 3/2016 .............. H04S 3/02

OTHER PUBLICATIONS

Jansson et al., "Singing Voice Separation with Deep U-Net Convolutional Networks", received from https://archives.ismir.net/ismir2017/paper/000171.pdf, Oct. 23-27, 2017, 9 pages.
(Continued)

*Primary Examiner* — George C Monikang
(74) *Attorney, Agent, or Firm* — Aikin & Gallant, LLP

(57) ABSTRACT

A sound scene is represented as first order Ambisonics (FOA) audio. A processor formats each signal of the FOA audio to a stream of audio frames, provides the formatted FOA audio to a machine learning model that reformats the formatted FOA audio in a target or desired higher order Ambisonics (HOA) format, and obtains output audio of the sound scene in the desired HOA format from the machine learning model. The output audio in the desired HOA format may then be rendered according to a playback audio format of choice. Other aspects are also described and claimed.

16 Claims, 6 Drawing Sheets

(56) References Cited

U.S. PATENT DOCUMENTS

| | | | | |
|---|---|---|---|---|
| 2019/0371348 | A1 | 12/2019 | Shahbazi Mirzahasanloo | |
| 2020/0107118 | A1* | 4/2020 | Salehin .................. | H04R 3/005 |
| 2021/0098004 | A1* | 4/2021 | Sen ......................... | H04S 3/008 |
| 2021/0329381 | A1 | 10/2021 | Holman et al. | |
| 2023/0274747 | A1 | 8/2023 | Baumgarte | |
| 2024/0312468 | A1 | 9/2024 | Nawfal et al. | |

OTHER PUBLICATIONS

Zotter et al., "All-Round Ambisonic Decoding: Spread and Correlation", received from https://pub.dega-akustik.de/DAGA_2022/data/articles/000344.pdf, Mar. 2022, 5 pages.

Luo et al., "Deep Clustering and Conventional Networks for Music Separation: Stronger Together", received from https://www.ncbi.nlm.nih.gov/pmc/articles/PMC5791533/, Jan. 31, 2018, 15 pages.

* cited by examiner

SPATIAL AUDIO UPSCALING USING MACHINE LEARNING

This nonprovisional patent application claims the benefit of the earlier filing date of U.S. provisional application No. 63/490,579 filed Mar. 16, 2023.

FIELD

One aspect of the disclosure relates to audio processing, in particular, to upscaling or increasing spatial resolution from first order Ambisonics to a higher order Ambisonics. Another aspect relates to extracting ambience from a stereo input file, as first order ambisonics, FOA.

BACKGROUND

Sound may be understood as energy in the form of a vibration. Acoustic energy may propagate as an acoustic wave through a transmission medium such as a gas, liquid or solid. A microphone may capture acoustic energy in the environment. A microphone may include a transducer that converts the vibrational energy caused by acoustic waves into an electronic signal which may be analog or digital. The electronic signal, which may be referred to as a microphone signal, characterizes and captures sound that is present in the environment. Two or more microphones may form a microphone array that senses sound and spatial characteristics (e.g., direction and/or location) of the sound field in an environment.

A processing device, such as a computer, a smart phone, a tablet computer, or a wearable device, can run an application that plays audio to a user or processes audio to convert the audio from one format to another. For example, a computer can launch an audio conversion application, or an audio playback application such as a movie player, a music player, a conferencing application, a phone call, an alarm, a game, a user interface, a web browser, or other application that outputs audio (with captured sound) to a user through speakers.

SUMMARY

In some aspects of the disclosure here, an audio processing device may be configured to perform operations that upscale or increase spatial resolution (also referred to as super-resolution) first order Ambisonics (FOA) to higher order Ambisonics (HOA). The device may obtain a first order Ambisonics (FOA) audio that captures or represents a sound scene or an audio scene. FOA may be obtained based on audio capture, or it may be obtained through encoding of audio—any object can be encoded to any direction into FOA. For example, a 7.1.4 audio signal can be converted to FOA. The device may format each signal of the FOA audio to a stream of audio frames. The device may provide the formatted FOA audio to a machine learning (ML) model that is configured to upscale the formatted FOA audio into a target or desired HOA format. The output audio is obtained in the desired HOA format from the machine learning model and may then be rendered spatially.

Upscaling FOA to HOA provides increased spatial fidelity as well as improved output flexibility. A machine learning model may be utilized to upscale FOA to HOA and provide higher spatial fidelity with reduced power and reduced latency.

In another aspect, the audio processing device has an ML model-based subsystem (e.g., a Cov-Tas-Net neural network) that is configured to extract ambience (also referred to here as background sound or diffuse sound content) out of a stereo input file, in the form of FOA. In one use case, the ambience in FOA format (ambience FOA) may then be upscaled to HOA as described above, before being spatially rendered for playback through a desired speaker layout. In one instance, the speaker layout is loudspeakers, and the speaker driver signals are produced by an ambisonics panning method such as All-Round Ambisonics Decoding, AllRAD which can render the ambience FOA to any arbitrary speaker layout. In another instance, the speaker layout is headphones, and the left and right headphone driver signals are produced by for example projecting the ambience FOA to any desired spherical speaker grid such as the T-Design grid. The ambience FOA may be rendered directly, without being up mixed to HOA, along with one or more of left, right and center channels that are also extracted from the stereo input. In all cases, as the ambience in FOA form is derived from the entire sound field, it not only enables creation of a more immersive sound field (giving the illusion of space when the stereo input file is being rendered by the playback system) despite being provided with only a stereo input, but also enables flexibility in how the stereo input file is spatially rendered for playback.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Figure 1:
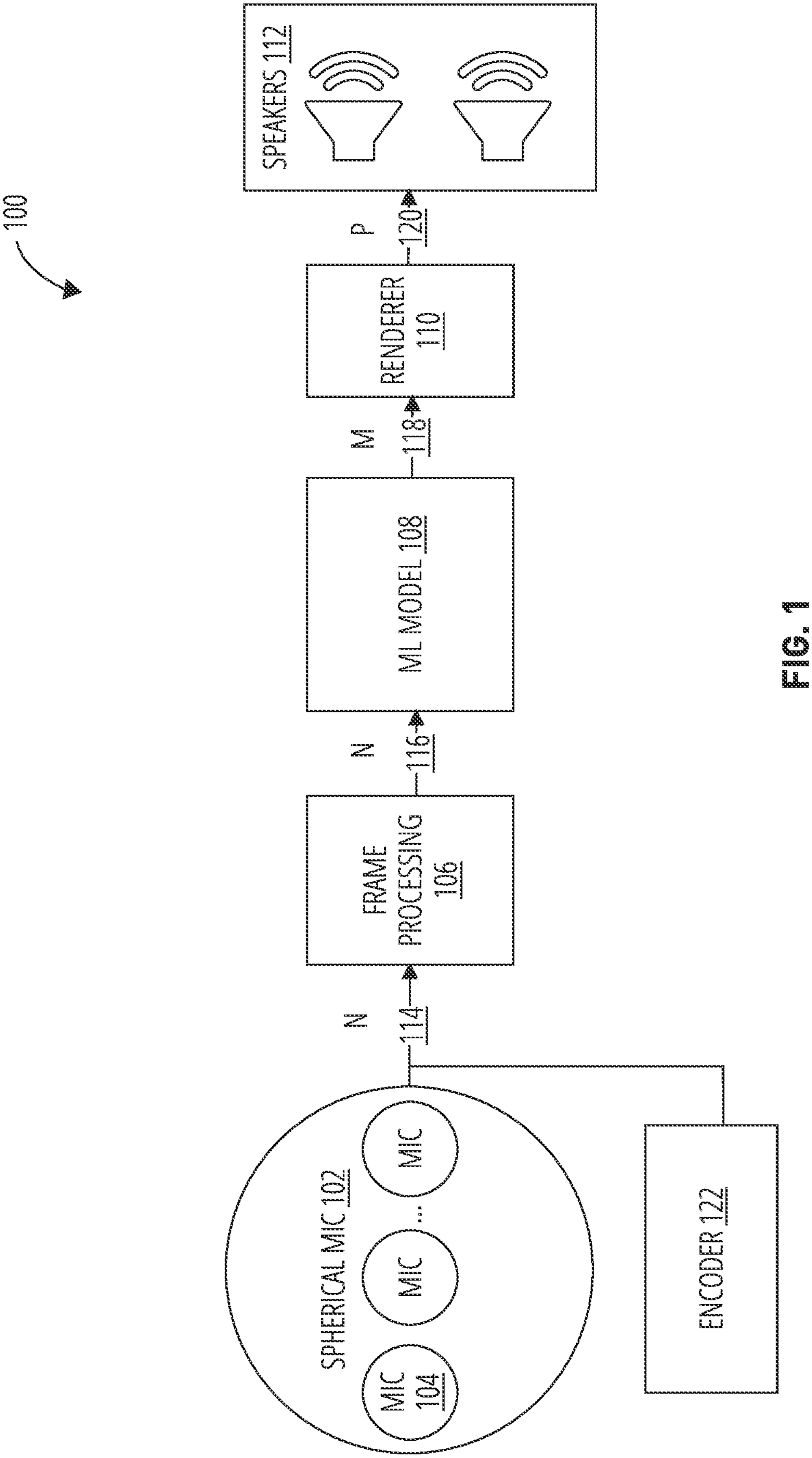
FIG. 1 shows an example of an audio processing system for upscaling FOA to HOA with a machine learning model, in accordance with one aspect.

Ambisonics may be understood as a three-dimensional recording and playback format that represents a sound field in the form of spherical harmonics. The spherical harmonics captures acoustic energy over 360-degree horizontal and/or vertical plane (e.g., a sphere). An example of an Ambisonics format is B-Format or first order Ambisonics (FOA) consisting of four audio components—W, X, Y and Z. Each component can represent a different spherical harmonic component, or a different microphone polar pattern, pointing in a specific direction, each polar pattern being conjoined at a center point of the sphere.

Ambisonics has a hierarchical format. Each increasing order (e.g., first order, second order, third order, and so on) adds spatial resolution when played back to a listener. Ambisonics can be formatted with just the lower order Ambisonics, such as with first order, W, X, Y, and Z. This format, although having a low bandwidth footprint, provides low spatial resolution. Ambisonics audio can be extended to higher orders, increasing the quality or resolution of localization. With increasing order, additional Ambisonics components are introduced, for example, 5 new components are introduced for second order Ambisonics audio, 7 new components for third order Ambisonics audio, and so on. Higher order Ambisonics are typically required for high resolution immersive spatial audio experience. The spherical harmonics representation of the sound field supports spatial production or reproduction in various formats, using a suitable decoder. An FOA signal may be synthesized from encoding audio signals to a particular direction without the use of a spherical microphone capture.

A spherical microphone may be used to capture Ambisonics audio of a sound scene. The order of the Ambisonics recording (and the spatial resolution) may depend on the number of microphone transducers and the arrangement of the microphone transducers in the spherical microphone. Another way to obtain Ambisonics audio of a higher order is by upscaling a lower order Ambisonics audio such as FOA to higher order Ambisonics (HOA). HOA may be converted to a spatial audio playback format of choice.

Humans can estimate the location of a sound by analyzing the sounds at their two ears. This is known as binaural hearing and the human auditory system can estimate directions of sound using the way sound diffracts around and reflects off of our bodies and interacts with our pinna. These spatial cues can be artificially generated by applying spatial filters such as head-related transfer functions (HRTFs) or head-related impulse responses (HRIRs) to audio signals. HRTFs are applied in the frequency domain and HRIRs are applied in the time domain.

The spatial filters can artificially impart spatial cues into the audio that resemble the diffractions, delays, and reflections that are naturally caused by our body geometry and pinna. The spatially filtered audio can be produced by a spatial audio reproduction system (a renderer) and output through headphones. Spatial audio can be rendered for playback, so that the audio is perceived to have spatial qualities, for example, originating from a location above, below, or to the side of a listener.

FOA may be upscaled to HOA thereby providing for increased spatial fidelity and output flexibility. In some aspects, HOA audio (e.g., a first HOA audio) can also be upscaled to a higher order HOA format (e.g., a second HOA audio) using a machine learning model. In some aspects, low order HOA audio can also be upscaled to a higher order HOA format using a machine learning model. In some aspects scene rotation can efficiently occur in the Ambisonics domain using optional head-tracking data, prior to upscaling. FOA may be upscaled to HOA of any order. This results in higher spatial fidelity with reduced power and latency compared with conventional techniques.

In some aspects, the ML model may include a Conv-tasnet neural network. The ML model may receive a time domain input of FOA audio and upscale this to a time domain HOA audio. In other aspects, a ML model may utilize frequency domain input and produce frequency domain output. The FOA input may include block-based streaming (e.g., a stream of consecutive audio frames) in real-time. Additionally, the ML model may be used to perform batch processing FOA to HOA.

The flexibility of HOA allows a trained ML model to be used in multiple scenarios. For example, the output HOA audio may be truncated to FOA or lower order HOA as a form of data compression. Additional HOA upscaling can then be used to retrieve the original content. In another scenario, the HOA content can be fed to a binaural renderer that renders the HOA as binaural audio to be played over headphones. Such results may rival parametric encoding methods. In another scenario, the HOA content can be fed to a device-specific crosstalk canceller (XTC) to render the HOA audio as binaural audio virtually over built-in speakers of for example a smartphone, a laptop computer, or a tablet computer, with results that rival parametric methods. In another scenario, the HOA can be rendered directly to any arbitrary speaker layout (e.g., 5.1, 7.1, etc.) in conjunction with a panning algorithm such as, for example, a vector-base amplitude panning algorithm (VBAP), with results that rival current parametric methods. AllRAD, which is a use case of VBAP, can be used to convert spherical harmonics to loudspeaker channels. The same ML model that upscales the FOA to HOA which may then be used in a variety of differing applications.

FIG. 1 shows an example of an audio processing system 100 for upscaling FOA to HOA with a machine learning model, in accordance with one aspect. Audio processing system 100 may include processing logic that is configured to perform operations and methods described in the present disclosure. Processing logic, which may also be referred to as a processing device, may comprise hardware (e.g., circuitry, dedicated logic, programmable logic, a processor, a central processing unit (CPU), a system-on-chip (SoC), machine-readable memory, etc.), software (e.g., machine-readable instructions stored or executed by processing logic), or a combination thereof.

A spherical microphone 102 may include a plurality of microphones 104 (e.g., a microphone array) arranged in a geometric pattern to generate a first order Ambisonics (FOA) audio (FOA 114.) The FOA 114 may comprise four audio components—W, X, Y and Z. Each component represents a microphone pickup with a unique combination of polar pattern and orientation. Each component may be referred to as a signal.

It should be understood that FOA 114 may be obtained in a variety of manners. For example, an encoder 122 may be used to encode non-Ambisonics audio to FOA 114. In another example, FOA may be obtained from a library of FOA recordings, not necessarily directly from a spherical microphone 102. In another example, FOA 114 may be a truncated version of an HOA audio, as described in other sections. Regardless of the source, FOA 114 may include a spherical harmonic representation of an audio scene.

At frame processing 106, system 100 may obtain FOA 114 and format each signal of the FOA audio to a stream of audio frames. As discussed, FOA may include four total signals which may be referred to as W, X, Y, and Z. FOA may include one omnidirectional polar pattern (W) and three figure-eight polar patterns with X being aligned in the X axis, Y being aligned in the Y axis, and Z being aligned in the Z axis. In the frame processing 106 the processor may format each time-domain signal into its own sequence of audio frames with 'm' number of samples. As a result, the formatted FOA audio 116 may include four time-domain audio signals where each audio signal includes a sequence of time varying audio frames. In turn, each audio frame may contain 'm' number of samples.

System 100 may provide the formatted FOA audio 116 to a machine learning model 108 that is configured to upscale the formatted FOA audio 116 to a target or desired higher order Ambisonics (HOA) format. ML model 108 may be referred to as an ML upscaler. ML model 108 may include one or more machine learning algorithms such as, for example, an artificial neural network (ANN). Various artificial neural network topologies may be utilized, such as, for example, a convolutional neural network (CNN) or a deep convolutional neural network (DCNN). In one aspect, the ANN may include a convolutional time-domain audio separation network (Conv-TasNet).

System 100 may obtain output audio 118 from the ML model 108. The output audio 118 has the desired HOA format (e.g., a higher order than the input first order Ambisonics audio.) The ML model 108 may be trained to upscale the input FOA to the desired HOA. For example, in one aspect, the ML model 108 may be trained to upscale the input, formatted FOA audio 116 to an output audio 118 having a desired HOA format of a 4th order HOA audio. In another aspect, the desired HOA format may be a 5th order HOA audio. Test and experimentation may be performed to determine the desired HOA format given a particular ML model topology. This desired format may strike a balance between an acceptable spatial resolution while remaining in the capabilities of the ML model 108.

At a renderer 110, system 100 may render the output audio 118 to audio channels 120 having a playback format of choice. For example, the system 100 may apply spatial filters such as a head related impulse response (HRIR) or head related transfer function (HRTF) to produce binaural audio. In another example, the system may use a panning algorithm (e.g., VBAP, AllRAD, etc.) to produce speaker channels for a surround sound speaker format. The resulting audio channels 120 may correspond to a playback format of choice. For example, for a surround sound speaker system, speakers 112 may be loudspeakers that are placed in predetermined positions defined by a surround sound format. Audio channels 120 may include a respective audio channel that drives each of the respective speakers. Similarly, for binaural audio, audio channels 120 may include a left audio channel and a right audio channel with spatial cues. In that case, the speakers 112 may include a left speaker and a right speaker that are to be worn in, on, or over each ear of a user, e.g., as part of a headset. The left audio channel and right audio channel may drive a left ear-worn speaker and a right ear-worn speaker, to provide a spatial binaural audio experience.

In some aspects, system 100 may obtain and process FOA audio (FOA 114) during playback of the audio. This may be referred to as 'in real-time.' The system may obtain the FOA 114 as streamed audio (e.g., over a computer network). The system may then apply the frame processing 106 and the ML model 108 to convert the FOA 114 to HOA formatted output audio 118.

In some aspects, audio processing system 100 may comprise multiple devices which may each perform one or more of the functions shown. In other aspects, a single device (e.g., a mobile device, a streaming console, etc.) may perform the frame processing 106, the ML model 108, and the renderer 110. In some aspects, one or more of these functions may be performed by a single device that also houses speakers 112 (e.g., a head-worn device). Operations described may be distributed among one or more devices.

Figure 2:
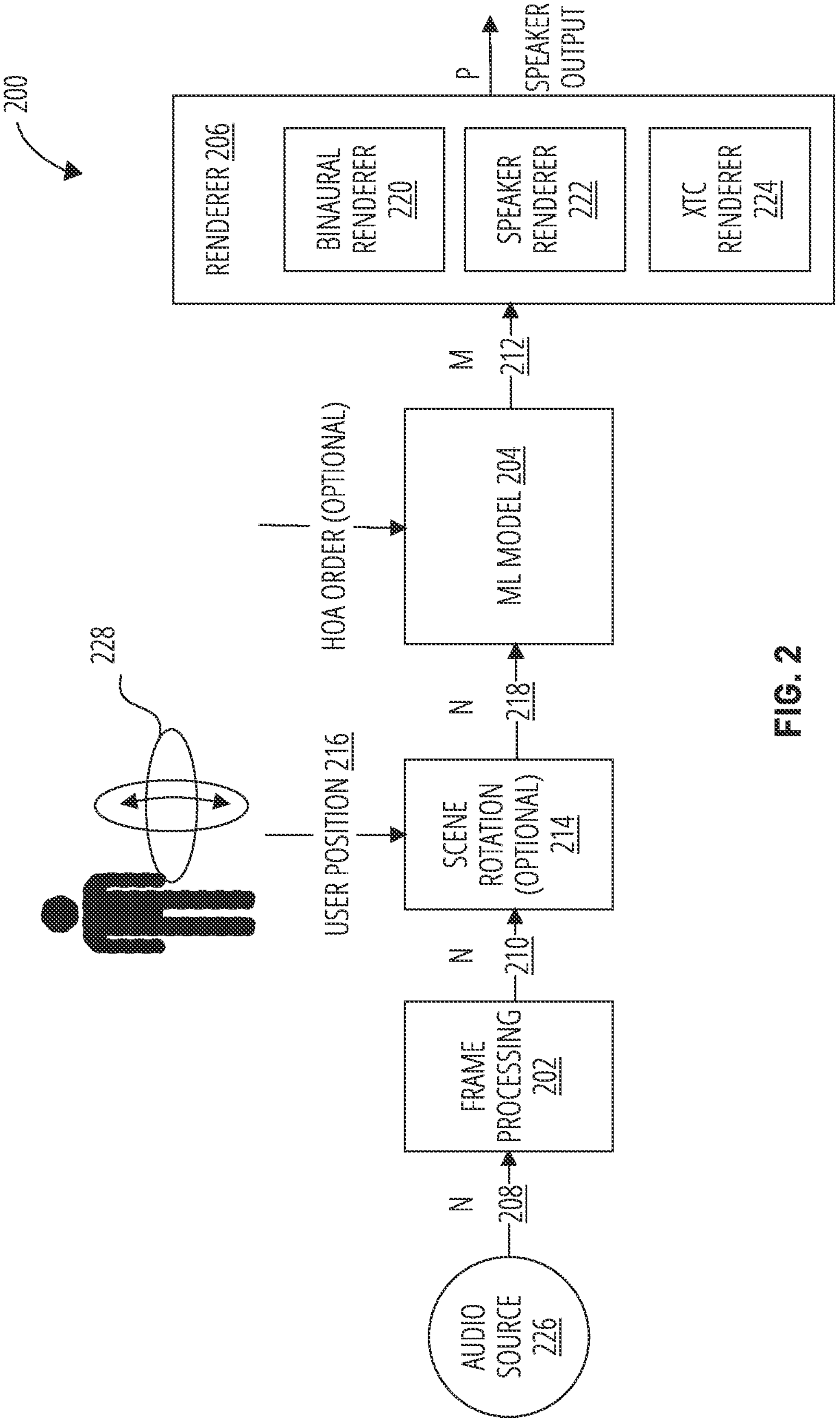
FIG. 2 shows an example of an audio processing system for upscaling FOA to HOA with scene rotation, in accordance with one aspect.

FIG. 2 shows an example of an audio processing system 200 that performs Ambisonics upscaling with scene rotation, in accordance with one aspect. Audio processing system 200 may include other aspects described, for example, above with respect to audio processing system 100.

The system 200 may obtain FOA audio 208 from an audio source 226. Audio source 226 may include a spherical microphone array that produces the FOA audio signal components based on the geometrical arrangement of the microphones. Alternatively, audio source 226 may encode non-Ambisonics audio to Ambisonics, or store and make available, one or more Ambisonics recordings. At block 202, the system 200 may format each signal of the FOA audio 208 to a stream of audio frames, into formatted FOA audio 210.

At block 214, the system may rotate the formatted FOA audio 210 based on a user position 216, to produce a rotated version 218 of the formatted FOA audio for use by the ML model 204. The user position 216 may include a user head position. The user position may include coordinates along an X, Y, Z plane, and/or a direction (e.g., spherical coordinates). In some aspects, the user position may include six degrees of freedom.

The user position may be determined based on one or more sensors 228. The one or more sensors 228 may include an accelerometer, an inertial measurement unit (IMU), a gyroscope, a camera, or any combination thereof. The one or more sensors 228 may be worn on the user (e.g., head-worn). The system 200 may apply an algorithm to sensor data to determine a user position 216 such as a head direction and/or head position. For example, the device may apply a simultaneous localization and mapping (SLAM) algorithm to camera images to determine the user position 216. Additionally, or alternatively, the system may apply a position tracking algorithm to an accelerometer or gyroscope signal to determine the user position 216. The system may track the user position 216 adjust the audio scene (represented by the formatted FOA audio 210) dynamically according to the current user position 216. As a result, the playback audio may compensate for the user's head position so that sound sources in the sound scene will be rendered to remain fixed relative to the user's environment, even when the user position changes.

The system 200 provides the formatted FOA audio (which may be rotated) to a machine learning model 204 that is configured to upscale the formatted FOA audio in a desired HOA format. The output audio 212 in the desired HOA format may be obtained from the machine learning model and rendered according to renderer 206.

In one example, rendering the output audio 212 is performed with a binaural renderer 220. The binaural renderer 220 may apply one or more HRTFs or HRIRs to the output audio 212 to produce binaural aural audio comprising a left audio channel and a right audio channel.

In one example, rendering the output audio 212 is performed with a speaker renderer 222. The speaker renderer 222 may render the output audio 212 based on a plurality of desired speaker positions of a surround sound speaker format to produce a plurality of speaker channels. The speaker renderer 222 may apply a panning algorithm to the output audio 212 to encode the output audio 212 into a plurality of speaker channels. The plurality of speakers may be rendered virtually or through physical loudspeakers.

In one example, rendering the output audio 212 is performed with a cross talk canceller (XTC) renderer 224. The XTC renderer may apply device-specific filters to the output audio 212 to produce binaural aural audio comprising a left audio channel and a right audio channel. As described, system 200 may perform the operations in real-time with dynamic updates to the user position. If the user changes position during playback, the playback audio automatically adjusts based on the current user position.

Figure 3:
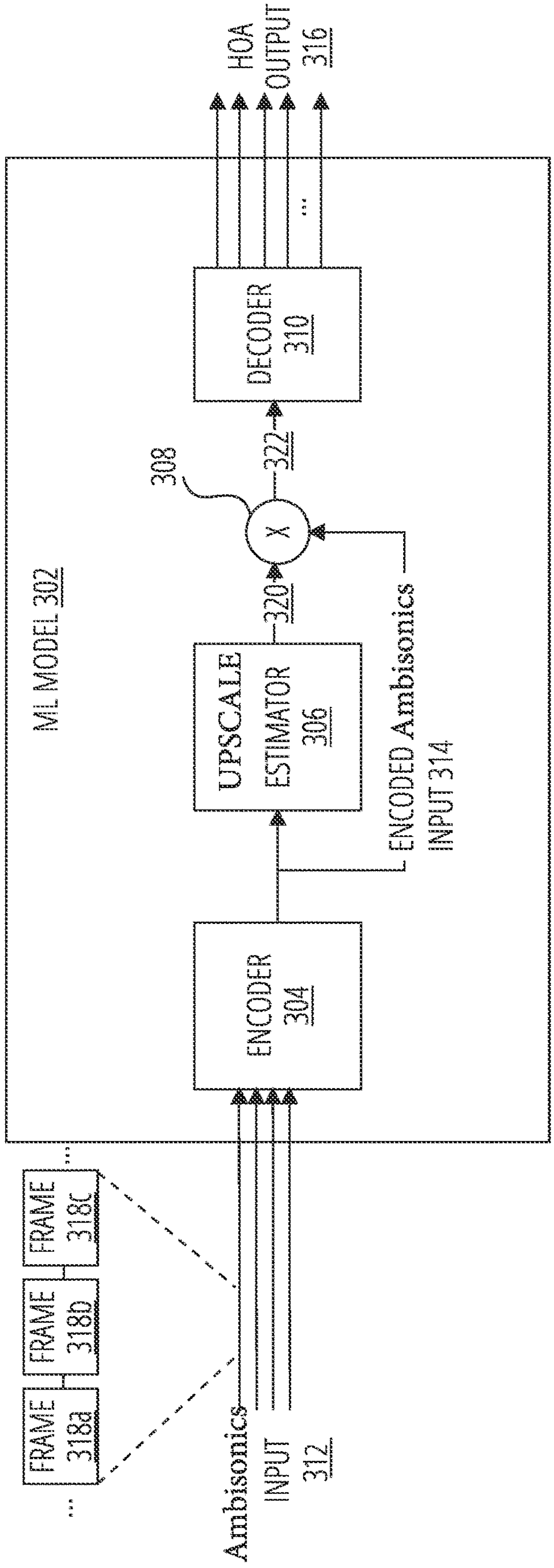
FIG. 3 shows an example of an ML model, in accordance with one aspect.

FIG. 3 shows an example of an ML model 302 in accordance with one aspect. The ML model 302 may include an artificial neural network that is trained to upscale an Ambisonics input 312 (e.g., FOA or a lower order HOA) to output an HOA audio format that is higher in order than the Ambisonics input 312.

Ambisonics input 312 may include a plurality of signals, each signal representing an Ambisonics component (e.g., a microphone pick-up signal with unique polar pattern and orientation). Each signal may comprise a sequence of frames such as frames 318*a*, 318*b*, 318*c*, and so on, each representing a window of time. Each frame may have a number 'm' of audio samples.

An artificial neural network may include a plurality of layers, each layer containing a plurality of nodes which can be referred to as artificial neurons. Nodes of an input layer can receive the Ambisonics input 312. Each node can have an edge that connects the node to one or more nodes in a subsequent layer. Each edge can have a weight that determines the impact of the node towards the node of the subsequent layer that the node is connected to. Each layer can have such nodes with such edges that connect to one or more nodes of subsequent layers. Each node can have an activation function that includes a weighted sum of the inputs to the node which determines if the node is activated or how activated the node is. An output layer of the neural network can produce a HOA output 316 with higher order than the Ambisonics input 312.

The machine learning model 302 can be trained using a training dataset that includes the Ambisonics input 312 and a corresponding HOA output. For example, the training dataset may include as input, FOA of various sounds in a sound scene, paired with a desired output that includes a corresponding HOA version of the same sound scene. The input and the desired output of the training data can be described as input-output pairs, and these pairs can be used to train the machine learning model in a process that may be understood as supervised training. The size of the dataset can vary depending on application. Training the ML model 302 (e.g., an artificial neural network) can include performing an optimization algorithm to calculate the value of the weights to best map the given inputs to desired outputs. The training of the machine learning model can include using non-linear regression (e.g., least squares) to optimize a cost function to reduce error of the output of the machine learning model (as compared to the approved output of the training data). Errors (e.g., between the output and the approved output) are propagated back through the machine learning model, causing an adjustment of the weights which control the neural network algorithm. This process occurs repeatedly for each recording, to adjust the weights such that the errors are reduced. The same set of training data can be processed multiple times to refine the weights. The training can be completed once the errors are reduced to satisfy a threshold.

It should be understood that the training data can vary depending on the various aspects described herein. Different inputs and outputs of the neural network can be trained with datasets that correspond to those inputs and outputs.

In some aspects, ML model 302 includes a deep convolutional neural network that takes time-domain waveforms as inputs (e.g., a convolutional time-domain audio separation network (Conv-TasNet)) and represents each waveform as a vector. Such a neural network may more typically be used for source separation, noise reduction, or directional signal extraction. The neural network can handle multichannel or single channel with a simple hyper-parameter change and may be suitable for batch and streaming audio processing with a simple hyper-parameter change.

In some aspects, one or more first layers of the neural network may be configured to encode each frame of the formatted FOA audio to a reduced data representation of the formatted FOA audio. For example, at block 304, one or more first layers (of nodes) may receive the Ambisonics input 312 and encode each frame of each signal having 'm' number of samples to a vector representation with 'y' number of features. The vector representation of Ambisonics input 312 may be referred to as encoded Ambisonics input 314. The number 'y' of features in the encoded Ambisonics input 314 may be one or more orders of magnitude smaller than the number of samples per frame of the Ambisonics input 312, thus contributing to an efficient upscaling process.

Further, one or more second layers of the neural network may be configured to determine a mask based on the encoded Ambisonics input 314 (a reduced data representation of the formatted FOA audio) and apply the mask to the encoded Ambisonics input 314 to generate the output audio in the desired HOA output. These operations may be performed by the remaining blocks 306, 308, and 310. For example, at the upscale estimator, block 306, the one or more second layers may be trained to determine a mask 320 based on the encoded Ambisonics input 314. The mask 320 may include masking parameters (e.g., values) or mapping parameters that enhance the spherical representation of the captured audio scene. At block 308, the mask 320 may be applied to the encoded Ambisonics input 314 (e.g., through convolution) to produce a mask applied encoded Ambisonics audio 322 that 'fills in the gaps' on the sphere between the components of the Ambisonics input 312. At block 310, the neural network layers are trained to decode the mask applied encoded Ambisonics audio 322, into the desired HOA output 316. The HOA output may contain a separate signal for each HOA component. Each signal may include a sequence of time-domain frames, as also described with respect to the Ambisonics input 312.

The end-to-end ML solution of FIG. 3 maps time-domain FOA to HOA output. The ML model 302 learns how to perform domain transform at blocks 304 and 310, and enhancement masking at block 306. The ML model 302 provides a highly flexible solution.

Figure 4:
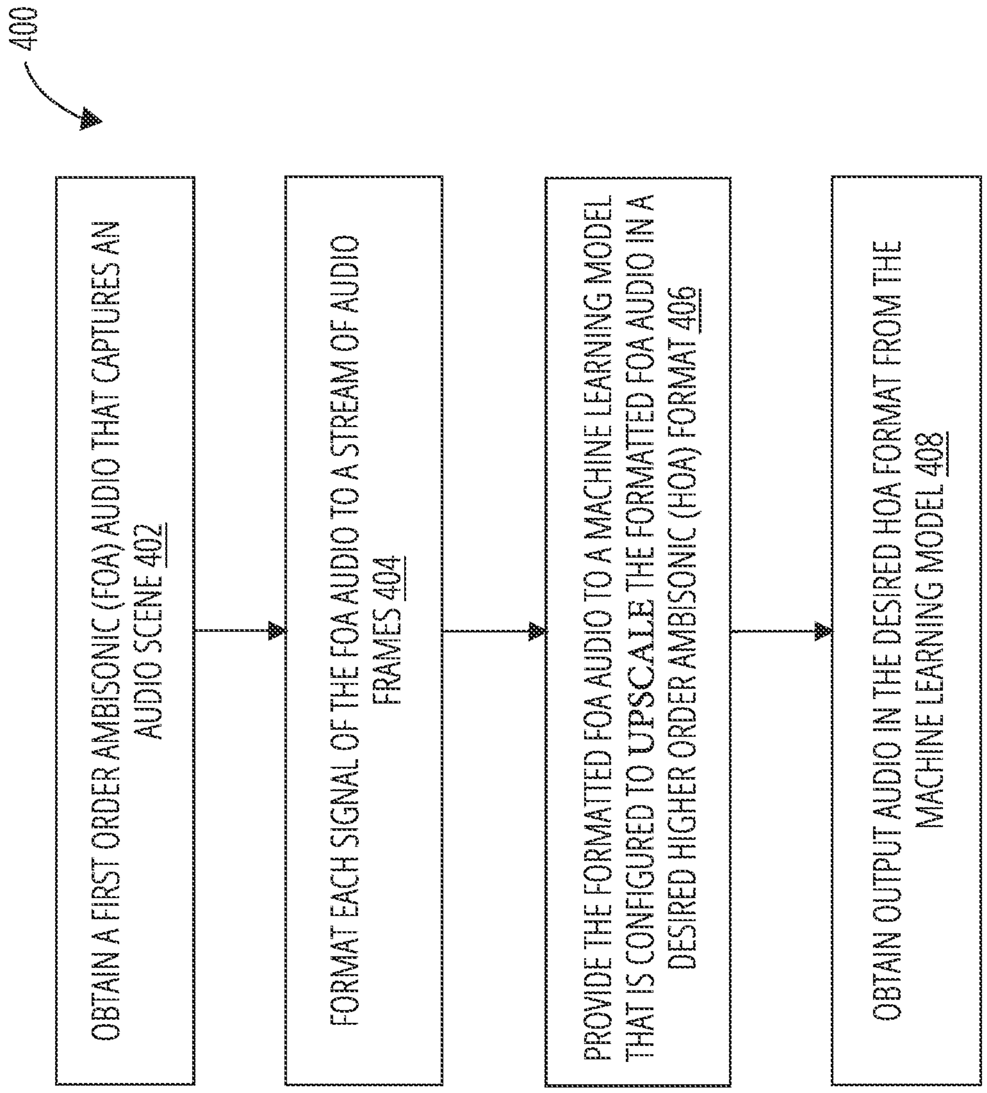
FIG. 4 illustrates an example of a method for upscaling Ambisonics audio, in accordance with one aspect.

FIG. 4 illustrates an example of a method 400 for upscaling Ambisonics audio, in accordance with one aspect. The method may be performed with various aspects described. The method may be performed by processing logic of a capture device, an audio processing device, or a combination thereof. Processing logic may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof.

Although specific function blocks ("blocks") are described in the method, such blocks are examples. That is, aspects are well suited to performing various other blocks or variations of the blocks recited in the method. It is appreciated that the blocks in the method may be performed in an order different than presented, and that not all of the blocks in the method may be performed.

At block 402, processing logic may obtain a first order Ambisonics (FOA) audio that captures an audio scene. The source from which the FOA audio is obtained may vary.

At block 404, processing logic may format each signal of the FOA audio to a stream of audio frames (e.g., time-domain audio frames). This can include sampling each time domain signal and dividing the samples into sequential frames of 'x' samples.

At block 406, processing logic may provide the formatted FOA audio to a machine learning model that is configured to upscale the formatted FOA audio in a desired higher order Ambisonics (HOA) format. As described, the ML model may include an artificial neural network.

At block 408, processing logic may obtain output audio in the desired HOA format from the machine learning model. In some aspects, the desired HOA audio format is a fifth order HOA or lower.

The output audio in the desired HOA format may be rendered according to a desired playback format. For example, the output audio may be rendered with a binaural renderer or XTC renderer to produce binaural audio comprising a left audio channel and a right audio channel. In another example, the output audio may be rendered based on a plurality of desired speaker positions, as defined by a surround sound speaker format, to produce a plurality of speaker channels. The surround sound speakers may correspond to virtual speakers or physical loudspeakers.

In some aspects, the output audio in the desired HOA format may be stored in computer-readable memory for retrieval at a later time. Additionally, or alternatively, the output audio may be streamed or transmitted to a remote device (e.g., over a computer network). The remote device may render the output HOA audio to a playback format of choice such as, for example, binaural audio, a surround sound speaker layout, or other playback format.

In some aspects, the output audio in the desired HOA format may be truncated back to FOA. For example, block 408 may result in obtaining output audio with fifth order HOA. From that output audio, processing logic may take components W, X, Y, Z (forming the FOA) and discard or remove each of the remaining or in this case higher order components of the output audio that is in the fifth order HOA format. The taken components may be referred to as compressed FOA audio, which may have a reduced data footprint. The compressed FOA audio may be stored in memory and/or transmitted to a remote device. Further, in some examples, the remote device may apply the machine learning model to the compressed FOA audio to obtain the desired HOA format. In this scenario, the desired HOA format may be the same or different from the desired HOA format at block 408.

In some aspects, the method 400 may be performed to upscale a first HOA audio to a second HOA audio with a higher order. For example, at block 402, rather than obtaining a FOA, processing logic may obtain first HOA audio. At block 404, processing logic formats the obtained first HOA audio to a stream of audio frames. At block 406, the formatted first HOA is provided to the machine learning model which is trained to upscale this to a second HOA with a higher order than the first HOA audio. At block 408, the second HOA is obtained from the machine learning model. The second HOA has the desired HOA format.

Figure 5:
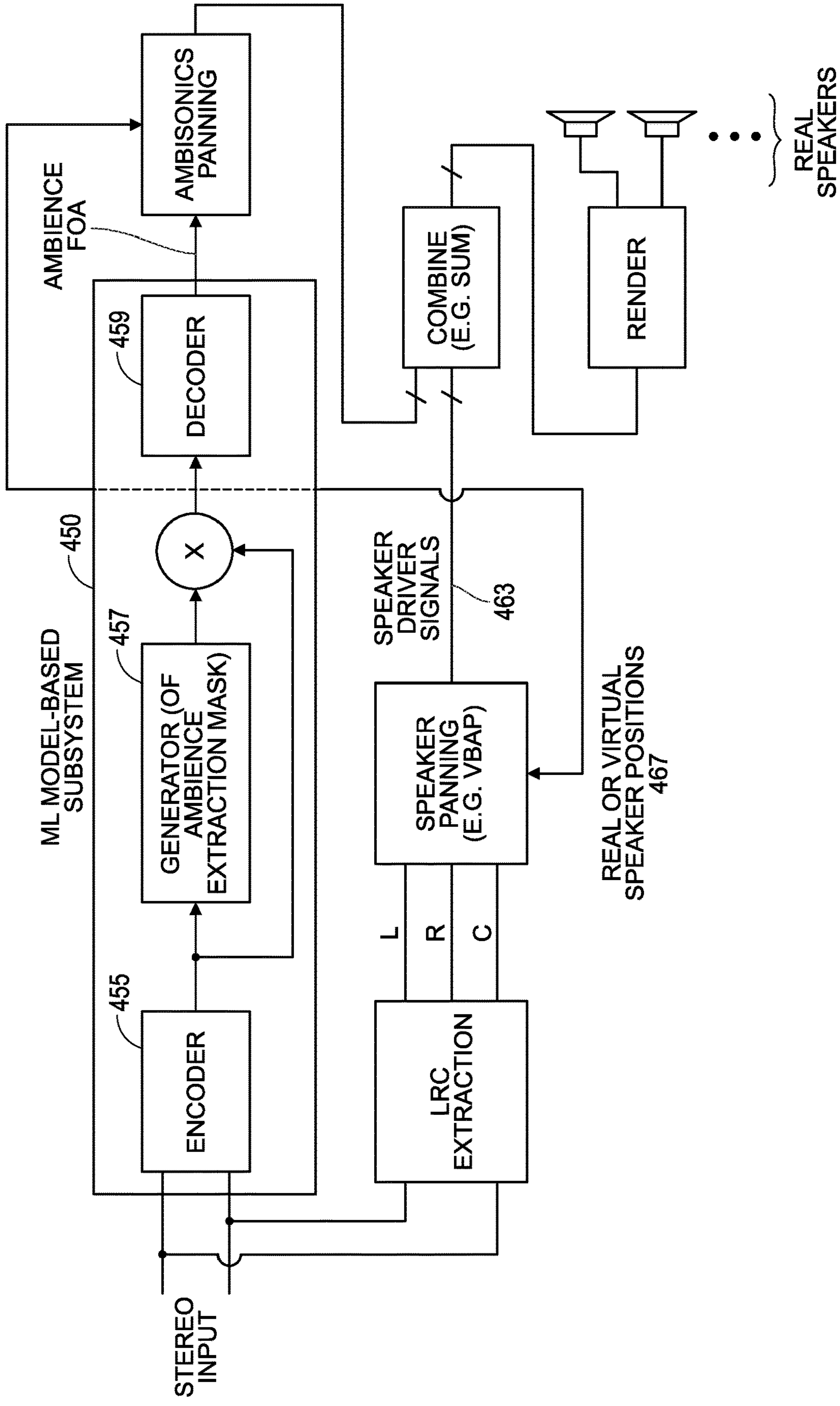
FIG. 5 is a block diagram of an example ML model-based technique for ambience FOA extraction from a stereo input file.

Turning now to FIG. 5, this is a block diagram of an audio system for playback of a stereo input file. The stereo input file may be that of a sound program (e.g., the soundtrack of a movie) that has two audio channels, each in the form of a sequence of digital audio frames where each frame represents a window of time. Each frame may have a number 'm' of digital audio samples. An ML model-based subsystem 450 extracts ambience in the form of FOA, from the stereo input file. The output, ambience FOA (also referred to here as the extracted, ambience FOA) covers the entire sound field surrounding a listening position, as compared to just distinct predetermined locations (surrounding the listening position.)

The output, ambience FOA may be played back (rendered) to an arbitrary, real speaker layout, as follows. An Ambisonics panning method such as AllRAD may be used to convert the ambience FOA into a first set (of two or more) real or virtual speaker driver signals 463, based on the known positions of those real or virtual speakers (speaker positions 467.) These are then combined (e.g., summed) with a second set of the real or virtual speaker driver signals 463, where the second set are produced by applying a speaker panning algorithm (e.g., VBAP) to one or more of a left channel, a right channel, and a center channel, LRC, extracted from the original stereo input. The LRC are extracted from the original stereo input, based on the same, speaker positions 467. A renderer then processes the real combination or the virtual combination, of the first set of two or more real or virtual speaker driver signals 463 and the second set of two or more real or virtual speaker driver signals 463, into real speaker driver signals that that drive the real speakers of the audio system.

For instance, if the real speakers are headphones, then the renderer may be a binaural renderer that applies a set of input head related impulse responses or transfer functions (HRIR or HRTF), which may be personalized to a wearer of the headphones, to the virtual combination. A VBAP to T-design grid algorithm may be used for that purpose.

If the real speakers are a pair of speakers, for example integrated within a laptop computer, a tablet computer, or a smartphone, then the renderer that receives the virtual combination may be an XTC renderer.

If the real speakers are those of an established, surround sound speaker layout, e.g., 5.1 or 7.1.4, then in one example the first set real or virtual speaker driver signals 463 produced by the Ambisonics panning method (e.g., AllRAD) could be the real speaker driver signals for the speaker layout. Similarly, the second set of real or virtual speaker driver signals 463 that are produced by the speaker panning algorithm (e.g., VBAP) could also be the real speaker driver signals for the speaker layout. Their real combination (e.g., sum) may then be simply forwarded by the renderer, to drive the real speakers of speaker layout. In that case, the speaker positions 467 in the figure are those of the real speakers that constitute the speaker layout.

Conventional, non-ML techniques for deriving the ambience content of a stereo input file, e.g., using frequency-domain parametric approaches, are now improved upon by using an ML model-based subsystem instead. This ML model-based subsystem may include an artificial neural network that has been trained and so is able to extract the ambience (background sound) of an otherwise complete audio scene that is contained in a stereo input file.

An artificial neural network may include multiple layers, each layer containing multiple nodes which can be referred to as artificial neurons. Nodes of an input layer can receive the audio signals that constitute the stereo input. Each node can have an edge that connects the node to one or more nodes in a subsequent layer. Each edge can have a weight that determines the impact of the node towards the node of the subsequent layer that the node is connected to. Each layer can have such nodes with such edges that connect to one or more nodes of subsequent layers. Each node can have an activation function that includes a weighted sum of the inputs to the node which determines if the node is activated or how activated the node is. An output layer of the neural network produces the FOA version of the extracted ambience.

The ML model-based subsystem can be trained using a training dataset that includes random dry inputs (audio signals that have little to no reverberation or ambience in them) with various room models as input. It will be trained to extract the full spherical ambience sound field as its output. The input and the desired output of the training data can be described as input-output pairs, and these pairs can be used to train the subsystem in a process that may be understood as supervised training. The size of the dataset can vary depending on application. Training the subsystem can include performing an optimization algorithm to calculate the value of the weights to best map the given inputs to desired outputs. The training can include using non-linear regression (e.g., least squares) to optimize a cost function to reduce error of the output of the ML model-based subsystem (as compared to the approved output of the training data). Errors (differences between an output and an approved output) are propagated back through the subsystem, causing an adjustment of the weights which control the neural network algorithm. This process occurs repeatedly for each input-output pair, to adjust the weights such that the errors are reduced. The same set of input training data can be processed multiple times to refine the weights. The training can be considered to be completed once the errors are reduced enough to satisfy a threshold.

It should be understood that the training data can vary depending on the various aspects described herein. Different inputs and outputs of the neural network can be trained with datasets that correspond to those inputs and outputs.

In some aspects, the ML model-based subsystem includes an artificial neural network and more particularly a deep convolutional neural network that takes time-domain waveforms as inputs (e.g., a convolutional time-domain audio separation network, Conv-TasNet) and represents each waveform as a vector. Such a neural network may be one that is used for source separation, noise reduction, or directional signal extraction. The neural network can handle multichannel or single channel with a simple hyper-parameter change and may be suitable for batch and streaming audio processing with a simple hyper-parameter change.

Still referring to FIG. 5 and the example shown there, the ML model-based subsystem may have one or more first layers referred to as an encoder 455 of a neural network, which are configured to encode each frame of the 'original' stereo input's audio channels into a reduced data representation (of the original stereo input.) For example, one or more first layers (of nodes) forming the encoder 455 may encode each frame of each audio signal (having m number of samples) of the original stereo input, to a vector representation with y number of features. The vector representation may be referred to here as an encoded stereo input. The number y of features in the encoded stereo input may be one or more orders of magnitude smaller than the number m of samples per frame of the (unencoded) stereo input.

Further, one or more second layers referred to as a generator 457 are configured to determine an ambience extraction mask, based on the encoded stereo input. The mask may include masking or mapping parameters (e.g., scalar values) that serve to enhance the spherical representation of the audio scene (contained in the original stereo input.) The mask is then applied to the encoded stereo input, by a block depicted in the figure as a circled X, for example in a convolution operation. The results are referred to here as a mask-applied, encoded stereo input, which may be described as . . . .

The ML model-based subsystem of FIG. 5 also has a decoder 459, which is a set of neural network layers that have been trained to decode the mask-applied, encoded stereo input into a desired FOA, which is referred to here as the ambience FOA. The ambience FOA may contain a separate signal for each FOA component, and where each such signal may be a sequence of time-domain frames.

Figure 6:
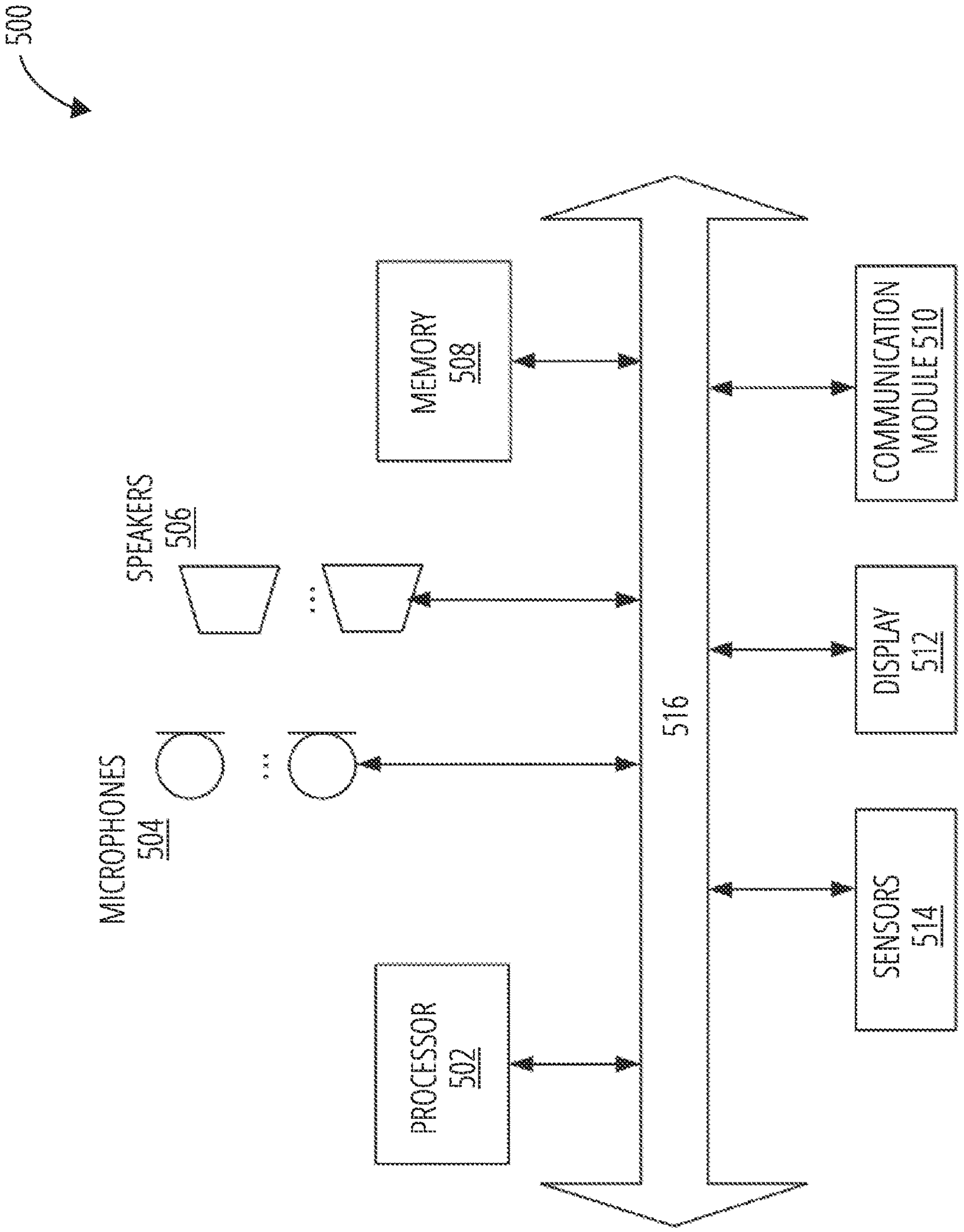
FIG. 6 illustrates an example of an audio processing system, in accordance with one aspect.

FIG. 6 illustrates an example of an audio processing system 500, in accordance with some aspects. The audio processing system can be an electronic device such as, for example, a desktop computer, a tablet computer, a smart phone, a computer laptop, a smart speaker, a media player, a household appliance, a headphone set, a head mounted display (HMD), smart glasses, an infotainment system for an automobile or other vehicle, or other computing device. The system can be configured to perform the method and processes described in the present disclosure.

Although various components of an audio processing system are shown that may be incorporated into headphones, speaker systems, microphone arrays and entertainment systems, this illustration is merely one example of a particular implementation of the types of components that may be present in the audio processing system. This example is not intended to represent any particular architecture or manner of interconnecting the components as such details are not germane to the aspects herein. It will also be appreciated if other types of audio processing systems that have fewer or more components than shown can also be used. Accordingly, the processes described herein are not limited to use with the hardware and software shown.

The audio processing system can include one or more buses 516 that serve to interconnect the various components of the system. A processor 502 (one or more processors) are coupled to bus as is known in the art. The processor(s) may be microprocessors or special purpose processors, system on chip (SOC), a central processing unit, a graphics processing unit, a processor created through an Application Specific Integrated Circuit (ASIC), or combinations thereof. Memory 508 can include Read Only Memory (ROM), volatile memory, and non-volatile memory, or combinations thereof, coupled to the bus using techniques known in the art. Sensors 514 can include an IMU and/or one or more cameras (e.g., RGB camera, RGBD camera, depth camera, etc.) or other sensors described herein. The audio processing system can further include a display 512 (e.g., an HMD, or touchscreen display).

Memory 508 can be connected to the bus and can include DRAM, a hard disk drive or a flash memory or a magnetic optical drive or magnetic memory or an optical drive or other types of memory systems that maintain data even after power is removed from the system. In one aspect, the processor 502 retrieves computer program instructions stored in a machine-readable storage medium (memory) and executes those instructions to perform operations described herein.

Audio hardware, although not shown, can be coupled to the one or more buses in order to receive audio signals to be processed and output by speakers 506. Audio hardware can include digital to analog and/or analog to digital converters. Audio hardware can also include audio amplifiers and filters. The audio hardware can also interface with microphones 504 (e.g., microphone arrays) to receive audio signals (whether analog or digital), digitize them when appropriate, and communicate the signals to the bus.

Communication module 510 can communicate with remote devices and networks through a wired or wireless interface. For example, communication modules can communicate over known technologies such as TCP/IP, Ethernet, Wi-Fi, 3G, 4G, 5G, Bluetooth, ZigBee, or other equivalent technologies. The communication module can include wired or wireless transmitters and receivers that can communicate (e.g., receive and transmit data) with networked devices such as servers (e.g., the cloud) and/or other devices such as remote speakers and remote microphones.

It will be appreciated if the aspects disclosed herein can utilize memory that is remote from the system, such as a network storage device which is coupled to the audio processing system through a network interface such as a modem or Ethernet interface. The buses can be connected to each other through various bridges, controllers and/or adapters as is well known in the art. In one aspect, one or more network device(s) can be coupled to the bus. The network device(s) can be wired network devices (e.g., Ethernet) or wireless network devices (e.g., Wi-Fi, Bluetooth). In some aspects, various aspects described (e.g., simulation, analysis, estimation, modeling, object detection, etc.,) can be performed by a networked server in communication with the capture device.

Various aspects described herein may be embodied, at least in part, in software. That is, the techniques may be carried out in an audio processing system in response to its processor executing a sequence of instructions contained in a storage medium, such as a non-transitory machine-readable storage medium (e.g., DRAM or flash memory). In various aspects, hardwired circuitry may be used in combination with software instructions to implement the techniques described herein. Thus, the techniques are not limited to any specific combination of hardware circuitry and software, or to any particular source for the instructions executed by the audio processing system.

In the description, certain terminology is used to describe features of various aspects. For example, in certain situations, the terms "processing," "encoder," "decoder," "estimator," "processor," "model," "renderer," "system," "device," "filter," "engine", and "block" may be representative of hardware and/or software configured to perform one or more processes or functions. For instance, examples of "hardware" include, but are not limited or restricted to, an integrated circuit such as a processor (e.g., a digital signal processor, microprocessor, application specific integrated circuit, a micro-controller, etc.). Thus, different combinations of hardware and/or software can be implemented to perform the processes or functions described by the above terms, as understood by one skilled in the art. Of course, the hardware may be alternatively implemented as a finite state machine or even combinatorial logic. An example of "software" includes executable code in the form of an application, an applet, a routine or even a series of instructions. As mentioned above, the software may be stored in any type of machine-readable medium.

Some portions of the preceding detailed descriptions have been presented in terms of algorithms and symbolic representations of operations on data bits within a computer memory. These algorithmic descriptions and representations are the ways used by those skilled in the audio processing arts to convey the substance of their work most effectively to others skilled in the art. An algorithm is here, and, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of an audio processing system, or similar electronic device, that manipulates and transforms data represented as physical (electronic) quantities within the system's registers and memories into other data similarly represented as physical quantities within the system memories or registers or other such information storage, transmission or display devices.

The processes and blocks described herein are not limited to the specific examples described and are not limited to the specific orders used as examples herein. Rather, any of the processing blocks may be re-ordered, combined, or removed, performed in parallel or in serial, as desired, to achieve the results set forth above. The processing blocks associated with implementing the audio processing system may be performed by one or more programmable processors executing one or more computer programs stored on a non-transitory computer readable storage medium to perform the functions of the system. All or part of the audio processing system may be implemented as special purpose logic circuitry (e.g., an FPGA (field-programmable gate array) and/or an ASIC (application-specific integrated circuit)). All or part of the audio system may be implemented using electronic hardware circuitry that include electronic devices such as, for example, at least one of a processor, a memory, a programmable logic device or a logic gate. Further, processes can be implemented in any combination of hardware devices and software components.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

While certain aspects have been described and shown in the accompanying drawings, it is to be understood that such aspects are merely illustrative of and not restrictive, and the disclosure is not limited to the specific constructions and arrangements shown and described, since various other modifications may occur to those of ordinary skill in the art.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

It is well understood that the use of personally identifiable information should follow privacy policies and practices that are recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A method comprising:

obtaining a first order Ambisonics (FOA) audio that captures an audio scene;

formatting each signal of the FOA audio to a stream of a plurality of audio frames, as formatted FOA audio;

providing the formatted FOA audio to a machine learning model that is configured to upscale the formatted FOA audio into a desired higher order Ambisonics (HOA) format;

obtaining output audio in the desired HOA format from the machine learning model;

truncating the output audio to obtain a compressed FOA audio; and transmitting the compressed FOA audio to a remote device, wherein the remote device applies the machine learning model to the compressed FOA audio to obtain the desired HOA format.

2. The method of claim 1, further comprising: rendering the output audio with a binaural renderer to produce binaural aural audio comprising a left audio channel and a right audio channel.

3. The method of claim 1, further comprising: rendering the output audio based on a plurality of desired speaker positions of a surround sound speaker format to produce a plurality of speaker channels.

4. The method of claim 1, further comprising: rendering the output audio with a cross talk canceller (XTC) to produce binaural aural audio comprising a left audio channel and a right audio channel.

5. The method of claim 1, further comprising: rotating the FOA audio based on a user head position and providing a rotated version of the formatted FOA audio to the machine learning model.

6. The method of claim 1, further comprising: transmitting the output audio in the desired HOA format to a remote device.

7. The method of claim 1, wherein the desired HOA format is a fifth order HOA or lower.

8. The method of claim 1, wherein the machine learning model comprises a neural network comprising one or more first layers configured to encode each frame of the formatted FOA audio to a reduced data representation of the formatted FOA audio.

9. The method of claim 8, wherein the neural network further comprises one or more second layers configured to determine a mask or mapping based on the reduced data representation of the formatted FOA audio and apply the mask to the reduced data representation of the formatted FOA audio to generate the output audio in the desired HOA format.

10. An audio system, comprising:

a processor configured to:

obtain first order Ambisonics (FOA) audio that includes a captured sound scene;

rotate the FOA audio based on a user head position to produce a rotated FOA audio;

format each signal of the rotated FOA audio to a stream of audio frames, as a formatted rotated FOA audio;

provide the formatted rotated FOA audio to a machine learning model that is configured to upscale the formatted rotated FOA audio into a desired higher order Ambisonics (HOA) format;

obtain output audio of the captured sound scene in the desired HOA format from the machine learning model;

remove higher order components of the output audio in the desired HOA format, to result in a compressed FOA audio; and transmit the compressed FOA audio to a remote device, wherein the remote device applies the machine learning model to the compressed FOA audio to obtain the desired HOA format.

11. The audio system of claim 10, further comprising: rendering the output audio with a binaural renderer to produce binaural aural audio comprising a left audio channel and a right audio channel.

12. The audio system of claim 10, further comprising: rendering the output audio based on a plurality of desired speaker positions of a surround sound speaker format to produce a plurality of speaker channels.

13. The audio system of claim 10, further comprising: rendering the output audio with a cross talk canceller (XTC) to produce binaural aural audio comprising a left audio channel and a right audio channel.

14. A non-transitory machine-readable medium having stored therein instructions that, when executed by a processing device, cause the processing device to:

obtain a first order Ambisonics (FOA) audio;

format each signal of the FOA audio as time-domain audio frames;

provide the time-domain audio frames to a machine learning model that is configured to upscale the FOA audio as a target higher order Ambisonics (HOA) format; and obtain output audio in the target HOA format from the machine learning model;

remove higher order components of the output audio in the target HOA format, to result in a compressed FOA audio; and transmit the compressed FOA audio to a remote device, wherein the remote device applies the machine learning model to the compressed FOA audio to obtain the target HOA format.

15. The non-transitory machine-readable medium of claim 14, wherein the target HOA format is a fifth order HOA or lower.

16. The non-transitory machine-readable medium of claim 14, wherein the machine learning model comprises a neural network comprising one or more first layers configured to encode each frame of the time-domain audio frames to a reduced data representation, and one or more second layers configured to determine a mask based on the reduced data representation and apply the mask to the reduced data representation to generate the output audio in the target HOA format.

* * * * *